Patented Mar. 3, 1931

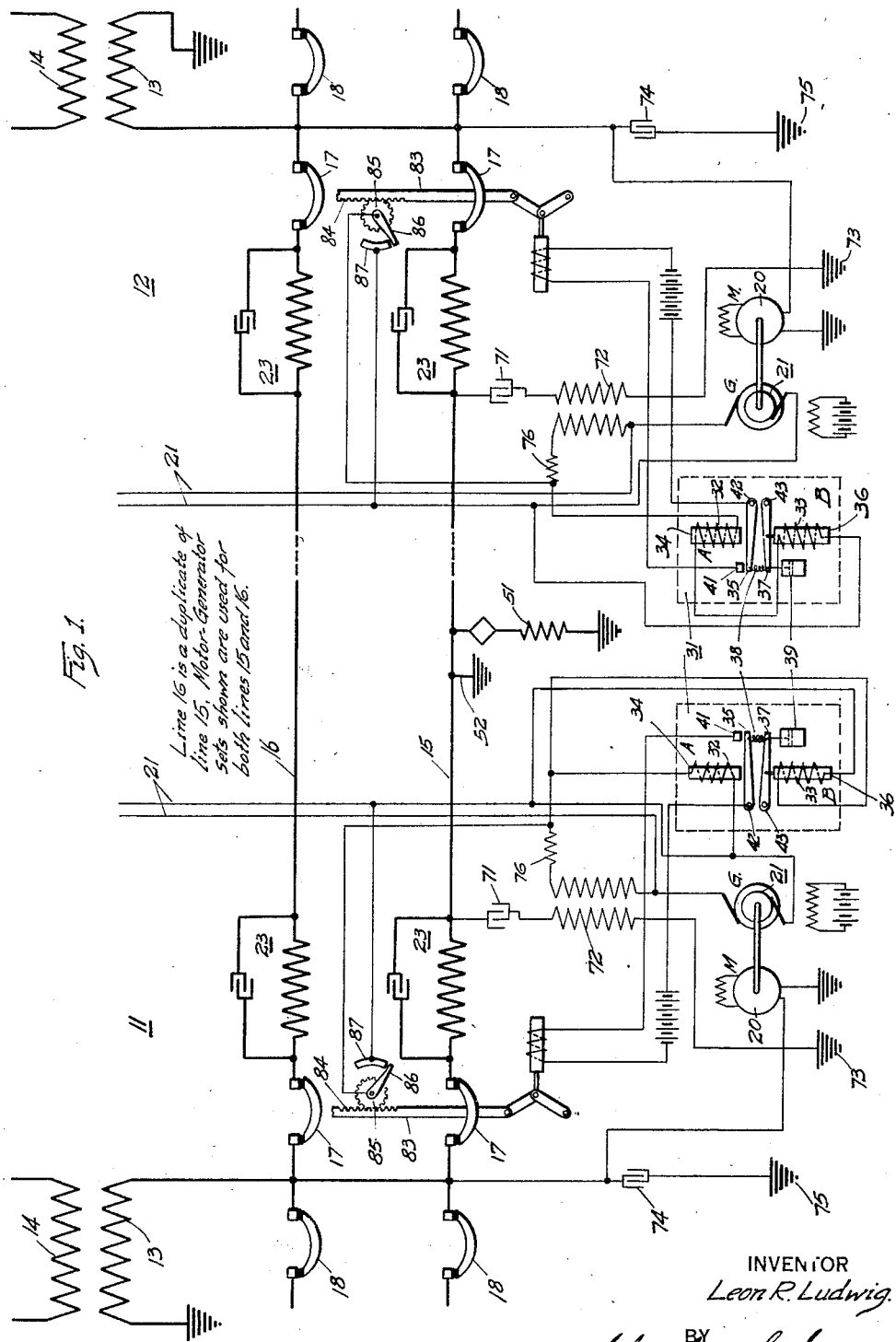

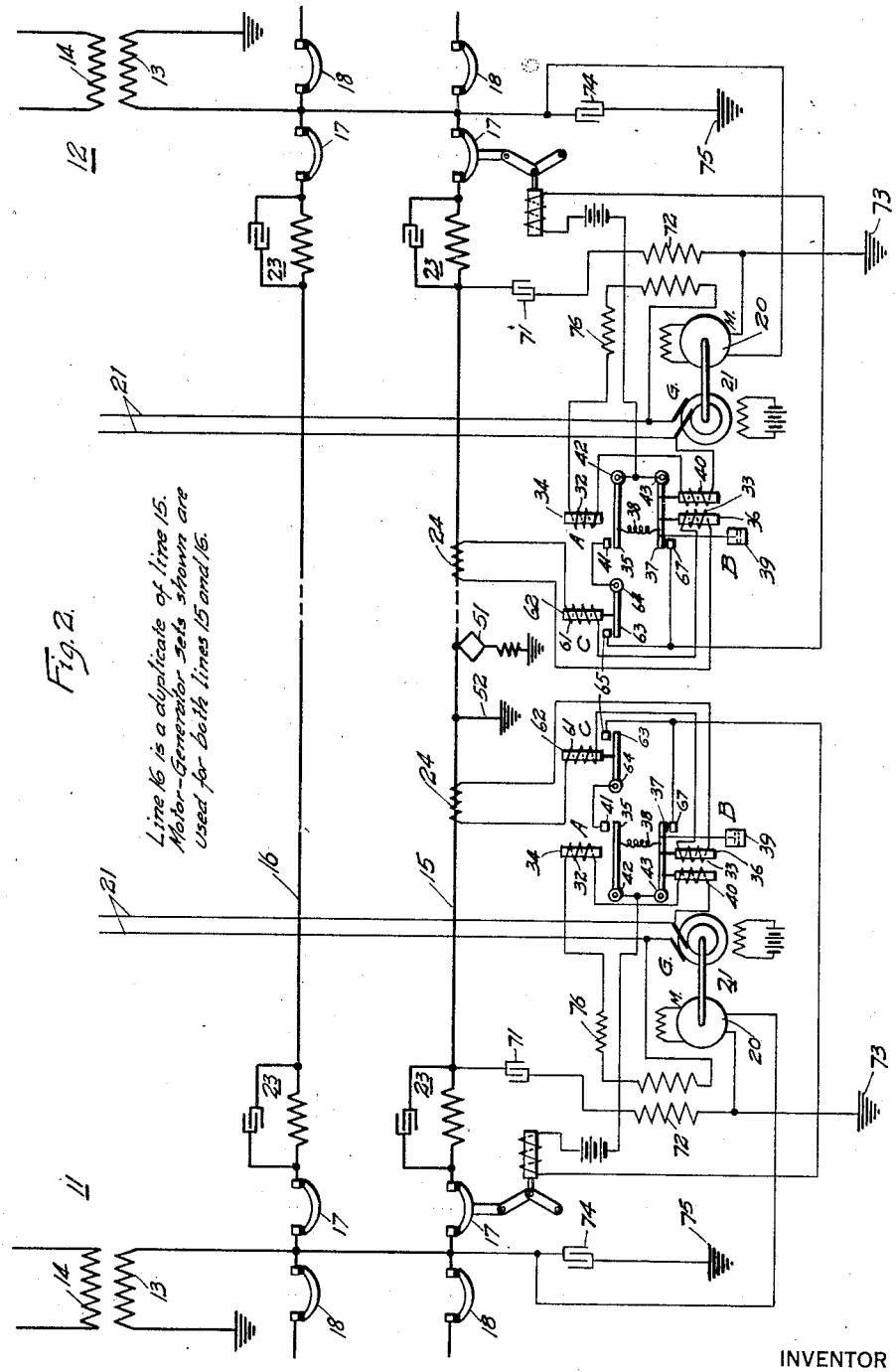

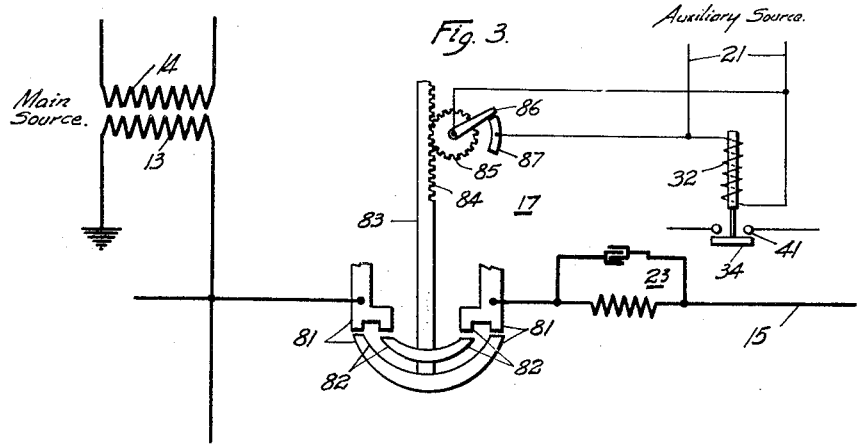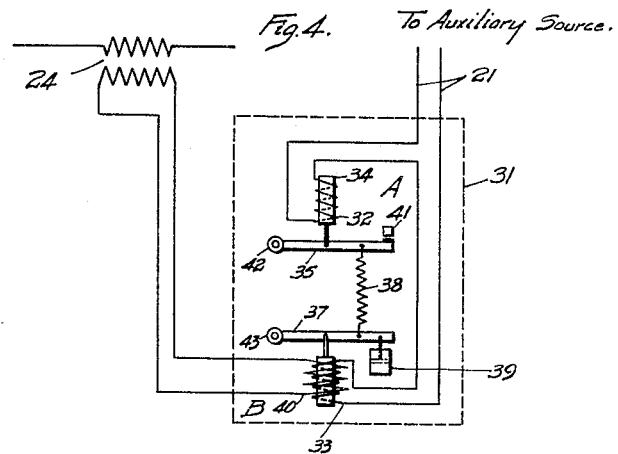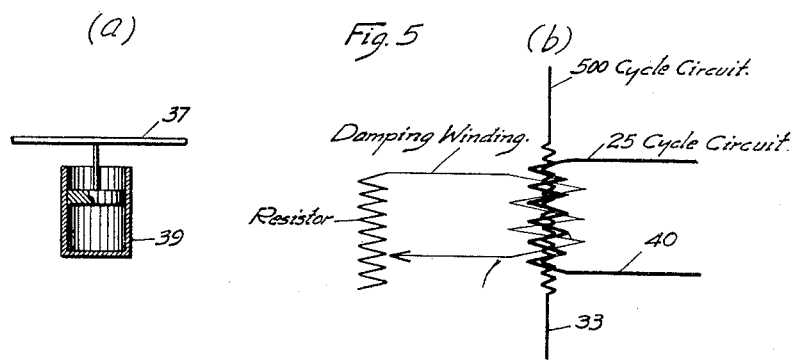

1,794,971

UNITED STATES PATENT OFFICE

LEON R. LUDWIG, OF WILKINSBURG, PENNSYLVANIA, ASSIGNOR TO WESTINGHOUSE ELECTRIC & MANUFACTURING COMPANY, A CORPORATION OF PENNSYLVANIA

PROTECTIVE RELAY SYSTEM

Application filed December 9, 1927. Serial No. 238,861.

This invention relates to circuit-breaker control and protective systems for electric power systems and particularly to such systems as utilize superimposed control currents of a special frequency different from that of the main source of power.

This invention is directed to subject-matter similar to that considered in the co-pending applications of J. F. Peters (Case 13,402) Serial 220,554, filed Sept. 19, 1927 and (Case 13,453) Serial 221,605, filed Sept. 23, 1927 both assigned to the Westinghouse Electric & Manufacturing Company.

One object of this invention is to provide a protective system which shall discriminate between a faulty condition and other conditions, such as load or circuit conditions; also to provide a protective relay system which is automatically adjusted and pre-set in accordance with either load conditions or circuit conditions.

Another object is to provide means for presetting the tripping coil or operating coil of a relay controlling a circuit interrupter, which means shall be dependent upon, or responsive to, the impedance of its associated circuit to the auxiliary frequency, or dependent upon, or responsive to, load current, or dependent upon both the impedance and load effects compounded.

Another object is to provide a means of compensating for out-of-phase control currents and to avoid any trouble arising because of the fact that the auxiliary sources of power might not operate in exact phase opposition.

Another object is to arrange, in any kind of a circuit-breaker tripping coil, for isolating a fault condition, a device which will control the tripping relay in accordance with the impedance or in accordance with the load, which both the device and the tripping relay are adapted to measure.

Another object of this system and this relay is to provide a means of adjusting the differences of impedances established when main units of power, such as generators or transformers, are connected to, or disconnected from, the power system.

Another object is to provide for greater limits in load currents without improper relay action.

Another object is to provide for simultaneous operation of the circuit interrupters at both ends of a line or conductor.

Another object is to provide a relay system for supervising the action of an associated relay responsive to auxiliary currents.

Another object is to provide a means for preventing undesirable action of circuit breakers when faults or transients occur within the superimposed auxiliary circuit itself and for preventing circuit-breaker action due to any condenser-charging current that may flow when the corresponding circuit breaker is first closed.

Another object is to provide means for preventing operation of circuit breakers in a non-faulty conductor from surges that may be set up in parallel or adjacent main power conductors. In other words, to provide relatively perfect selectivity between the good and the faulty conductors or wires.

This invention is intended as an improvement upon the special control-frequency-circuit-breaker-control system as described in J. F. Peters Case 13,402, Serial 220,554 and Peters Case 13,453, Serial 221,605, hereinbefore mentioned. In such systems, if several locomotives or other units of connected load equipment are connected in one contact line of a railway power system, the impedance of the locomotives to the superimposed 500 cycle current might, in some cases, be lower than the impedance of a short circuit or fault to the same 500 cycle currents, and the circuit breakers might, accordingly, trip, which is an undesirable feature. The system which I propose herein precludes that possibility by using a relay of special form.

The system is described herein with reference to a single-phase railway power system, but it is equally applicable to any power system whatsoever, whether single phase or polyphase, grounded or non-grounded, or direct current, provided such systems utilize a superimposed control current of a special frequency different from that of the main source of power.

This protective system accomplishes one of its objects and has the advantage that it provides means of automatically pre-setting the tripping coil of a relay controlling its associated circuit interrupter, dependent upon the impedance to the auxiliary source currents placed within the corresponding circuit.

Figure 1 illustrates this protective pre-setting device applied to a single phase railway system utilizing 500 cycle superimposed control currents. It also shows a means and method of interlocking the circuit breaker and its associated relay.

Fig. 2 is a diagram illustrating both the pre-setting and supervising devices applied to the same system.

Fig. 3 is a diagram illustrating the relay and the circuit-breaker-interlock for short circuiting the operating coil of the relay.

Fig. 4 is a diagram illustrating a variation in the utilization of a compound coil on the pre-setting device.

Figs. 5 (a) and (b) are diagrams illustrating variations in the means of providing time-lag or time-delay operation of the pre-setting coil.

In Fig. 1, is shown a section 11—12 of a single phase, railway power system, terminated by substations 11 and 12 located at each end of the section. The main sources of power at 25 cycles from the step-down substations 11 and 12 are applied to the conductors or contact lines 15 and 16 through transformers 13 at either or both ends of the parallel conductors or contact lines 15 and 16. The return path, in this particular case, is through a ground or earth. Circuit interrupters 17 are provided at each end of each conductor. Associated with each substation is an auxiliary source of power 21, of special control frequency of 500 cycles, in this instance, which is applied near each end of each conductor through transformers 72 and condensers 71.

The auxiliary sources 21 operate continuously in phase opposition, under normal conditions, and the currents therefrom are utilized to measure the impedance of circuits closed by fault connections such as the fault 52 or by loads such as the load 51.

Each auxiliary source 21, in this instance, consists of a generator driven by a synchronous motor 20 operating at a synchronous speed corresponding to that of the main source 13, which is 25 cycles in this particular case.

Instead of employing generators 21 as auxiliary sources of power, other current-producing devices, such as oscillating tubes, may be used. And, also, the generators 21 may be driven by prime movers other than by synchronous motors 20, as shown.

At junction points between the conductor sections, a condenser 74 is provided for draining off currents of frequencies different from that of the main source of power, such as those produced by arcing grounds, or stray auxiliary currents from adjoining conductors and thus preventing them from disturbing the relay system of adjacent conductors. Such condensers 74 are designed, to obstruct the passage of main source currents supplied by the sources of power 13.

Impedance devices 23 are provided in each conductor, near the ends thereof, which readily pass currents of main-source frequency from the main sources of power 13, but which obstruct or block currents of special control frequency from the auxiliary sources 21 and prevent them from going beyond the limits of the particular conductor to which they are applied.

Located in the auxiliary circuit is a double-element relay 31, a combination of elements A and B, which consists essentially of two coils 32 and 33 mounted upon a common base, two movable members 34 and 36 controlled by the coils 32 and 33, two pivoted arms 35 and 37 pivoted on pins 42 and 43, respectively, and controlled by the movable members 34 and 36, respectively, and a spring 38 between the two arms 35 and 37. A dash pot 39 or other means of securing time delay is provided for the arm 37 of the element B, which is the pre-setting element. A tripping contact 41 is provided for the arm 35 of the other element A, which is the tripping element or operating element for controlling the actuating means of the circuit interrupter 17. The operating element or tripping element A is quick-acting and the pre-setting element B is slow-acting.

This relay 31 is so constructed that the tripping element A is positive in action, that is to say, its armature 35 is arranged to operate at a definite excitation of the winding 32, depending upon the restraint of the spring 38. The restraining element B must be so constructed that the armature 37 may come to rest at any intermediate point in its travel, depending upon the magnitude of pre-setting desirable. The purpose of the dash pot 39 is to prevent the restraining or pre-setting element B from tightening the spring 38 so swiftly that the tripping element A does not have an opportunity to act if a short circuit or fault 52 occurs on the contact line. This means that the restraining element B must act, in point of time, after the trip contact 35, when a fault occurs. If a normal load 51 is placed on the line 15, however, the trip contact 41 is not closed or rendered effective, because the current in the coil 32 as it is adjusted, is insufficient to operate it. This same current, however, circulating through the coil 33, will cause the armature 37 of the pre-setting element B to move somewhat and tighten the restraining spring 38.

Under normal conditions of operation, all of the circuit interrupters 17 and 18 are closed and the contact lines or conductors 15 and 16 are energized in accordance with the main-source currents. The auxiliary circuits applied to the conductor 15 and, likewise, to all other conductors, such as 16, in parallel thereto, are normally operative, both sources of auxiliary power 21 being operating continuously in phase opposition, and assuming no short circuit, or no load upon the line 15, no auxiliary current will flow.

Now, assuming that a fault 52 occurs, then a path is formed which closes the auxiliary circuit and auxiliary-source current will flow in closed circuits energizing the relay coil 32 and closing the contacts 41 which, in turn, will cause the action of the circuit interrupters 17 at each end of the contact line 15 simultaneously. At the same time, the restraining element B, being slow-acting, does not have time to operate, and, consequently, has no restraining effect in the functioning of the system when a short circuit or other fault occurs.

Under normal conditions, when a locomotive 51 enters the line, the trip coil 32 will remain ineffective because the 500 cycle current is of a magnitude insufficient to operate it but the pre-setting coil 33 of element B will be effective to tighten the spring 38, dependent upon the number of locomotives and their corresponding impedance to the passage of the 500 cycle current, in this particular arrangement of connections having the pre-setting coil 33 responsive to auxiliary source currents. That is to say, this protective system and this double-element relay 31 provide a means of pre-setting the tripping element A of the relay, according to variations in the load equipment connected to the section 15. To explain further:

In practice, an ordinary locomotive impedance to 500 cycles may be, roughly, four times that of the contact line 15 to the same frequency, and it is, therefore, obvious that, if four locomotives are placed in the section 15 near to the end of the contact line, the relay nearest to it may trip. Such relay action is undesirable and is avoided by the use of the pre-setting element B of the automatic relay 31. When locomotives are placed anywhere within the section 15, the pre-setting element B will tighten the spring 38, thus restraining the tripping element A. As many locomotives, such as motored equipment 51, may be placed within the section or conductor 15 as are wanted, without causing any relay tripping action whatever, provided they are introduced therein in numbers less than four at one time. Both the elements A and B of the relay 31 are shown actuated by the auxiliary current at 500 cycles, with the result that the pre-setting is dependent upon the circuit impedance to 500 cycles rather than upon the load current in conductor 15.

The pre-setting or adjusting coil 33 is shown in substation 11 connected in parallel-circuit relation with the tripping coil 32, but it may also be connected in series-circuit relation, as shown in substation 12 of Fig. 1, and the effect will, in either case, be dependent upon the impedance of the main conductor circuit to 500 cycles. However, the series connection is preferable, because after the armature 37 of the pre-setting element B of the relay 31 changes its position, the inductance of its winding 33 changes, which means that the division of current through the two coils 32 and 33, in case they are in parallel, would be somewhat dependent upon the relative positions of the two armatures 34 and 36. The series-circuit relation is, therefore, the preferred method of connection.

Instead of connecting the pre-setting coil 33 of element B to the source of auxiliary current, it may be connected to the 25 cycle line by means of a current transformer 24 (see Fig. 2) and, when so connected, the pre-setting device B is dependent, not upon the impedance but, upon the load current which flows within the corresponding conductor 15. Whether connected responsive to the load current or to the auxiliary current, the pre-setting element will have the common advantage as a means of pre-setting the tripping element A.

However, both methods have advantages, and the advantages of both may be gained by using a compound coil, as shown in Fig. 2, or in Fig. 4, on the pre-setting element B. Such compound coil would have one winding carrying 500 cycle current, connected in series or in parallel with the 500 cycle trip coil 32, and also a second coil carrying the 25 cycle load current in accordance with the load current in its corresponding conductor 15.

Instead of placing the compound coils upon one member as shown in Fig. 4, two separate coils 33 and 40 may be used, as shown in Fig. 2, to avoid the interaction of main source currents and auxiliary source currents.

From the foregoing, it is evident that this system has a very important advantage over means previously used, in that it provides a means of pre-setting the tripping coil 32 of the operating relay controlling the circuit breaker 17, which pre-setting is either dependent upon the impedance to the auxiliary-source current in that section, or upon the load current in the same section, or upon both combined.

It also has another important advantage in case both the elements A and B of the double-element relay 31 are connected to the 500 cycle auxiliary circuit and carry 500 cycle current. This advantage is that if the two 500 cycle generators 21, supplying current at both ends of the line 15, are not in exact phase opposition, the resultant synchronizing current will not cause the relays A to trip. If such generators 21 at both ends of the line 15 become slightly out of phase, as they are liable to, current will flow in the auxiliary circuit, which current will cause the generators 21 to attempt to get back into exact phase opposition. If this current becomes large enough, the relays A may trip or operate, which action is undesirable; but, in this particular system, with the double-element relay, the circulating current thus caused will pass through the pre-setting coil 33 and tighten the restraining spring 38 and prevent the tripping element 32 from acting. Such circulating current, because of the inertia of the generators 21 and a certain time element required before their voltages can become out of phase, must, therefore, rise slowly, which means that the tripping coil 32 has no chance to act before being restrained by the pre-setting element 33. In other words, this invention compensates for any out-of-phase circulating currents that may develop in the superimposed auxiliary circuits.

An appreciable angle between the 500 cycle generator voltages at both ends of the line may arise, and the circulatory current resulting will flow in the 500 cycle network with the voltages out of phase, which will merely alter the setting of the pre-setting element B of the relay in such proportions that operating conditions will continue. The sole disadvantage of such circulatory current at 500 cycles is possible difficulties in interference in neighboring communication circuits.

In any system wherein the main units of power must form a portion of the closed circuit for 500 cycle current, if additional main units of power, such as generators or transformers, are connected to the system, the impedance of the circuit to 500 cycles is reduced thereby, thus increasing the flow of 500 relay current, because each additional unit merely provides extra parallel paths to the 500 cycle current. This current has a tendency to actuate the relay elements A, a condition which calls for a new setting of the pre-setting element B, and which, in this invention, is automatically taken care of by the restraining coil 33. That is to say, another important advantage of this double-element relay is that it automatically adjusts differences of impedances established when main units of power 13 at 25 cycles in this case, are added to the system.

A supervising element C may be used in connection with the double-element relay embodying elements A and B previously described. Referring to Fig. 2, a current transformer 24 supplies current of main-source frequency of 25 cycles to a relay C and to one coil 33 of the two coils 33 and 40 on the pre-setting element B. The other coil 40 of the pre-setting element B may be either in series with or in parallel-circuit relation with the tripping element A of the relay, both coils 32 and 40 to be supplied with the auxiliary source currents. The contacts 41 of element A and the contacts 63 of relay C are connected in series-circuit relation, and are bridged by contact 67 of relay element B, so that either relays A and C or relay B alone, when closed, will operate the circuit interrupter 17. In case of failure of the high-frequency system in the auxiliary circuit, relay B acts alone as a time limit trip for load current of the main source frequency.

The purpose of the relay C, the contact 65 of which is in series with that of relay A, is to give a check or to supervise the action of the high-frequency system or, more particularly, the action of the high-frequency relay consisting of the elements A and B. To explain further, this improvement relates to interlocking relays for 500-cycle circuit-breaker-control systems. Broadly, the purpose and advantage of this improvement are to supervise the action of the high-frequency relay A by placing in series with its contacts 41, the contacts 65 of a low-frequency overload-current relay C. The purpose of the overload relay C is to avoid circuit-breaker action in case the high-frequency relay operates because of some transient or fault within the 500-cycle system itself. One particular object of this means of interlocking is to avoid tripping the breaker 17 because of the condenser-charging current of the condenser 71 which flows when the associated breaker is first closed. Another object of this improvement is to provide means of operation of the relay system in case of any fault or failure within the 500-cycle superimposed system.

A particular advantage is to prevent tripping the breaker in one section when a short-circuit occurs in one of the adjacent sections. Improper action of the high-frequency relay might result from high-frequency surges, established on the contact lines when the fault develops an arc. To explain further, if an arcing ground should occur on the line 16, all of the resonant devices 23 which have been placed on the system are conductive to surges of current at their own frequencies. These surges may occur not only in the line 16 on which the fault occurs but on the adjacent lines such as line 15, and, therefore, might trip the relays, such as relay A, on the non-faulty lines, which would be undesirable. In case the high-frequency relay A should trip, because of any of these causes, the over-current relay C will not trip because the relay C is an over-current relay unaffected by such surges, and will, therefore, prevent undesirable relay action. This provides extreme selectivity between the parallel contact lines and other contact lines notwithstanding surges set up by arcing grounds, etc.

Element C may be added and used, as shown, combined with elements A and B or it may be used with element A alone or in any combination of the elements of A, B, or C, as described. It may be used on any power system whatsoever, employing superimposed relatively high-frequency control currents, or control currents of frequency different from that of the main source of power. The elements A and B will operate as previously described. The element C must be set so that the lowest short-circuit current obtainable will operate it. This element, therefore, will trip many times on relatively low currents but the breaker will not necessarily trip because the element A will not trip in the absence of faulty conditions. Conversely, the element A, as has been stated, will have false operation on account of some transients but, in this case, the element C will not trip in the absence of conditions of excess current supplied from transformer 24.

This improvement provides an entire elimination of any false relay operation due to "trolley bouncing." It was found by test that, occasionally, when the pantograph of a locomotive 51 bounced on the contact line 15 and drew an arc, the 500-cycle surges tripped the relay A. The relay C will not operate during these bounces, however, and will, therefore, guard against false operation of the circuit breaker 17. When the trolley 51 bounces and an arc is drawn, the current supplied to the locomotive 51 is reduced. It is during this time at which the arc is present that the 500-cycle element trips. The overcurrent in the 500 cycle system, which causes this tripping, is of very short duration and disappears before the pantograph is again back on the contact line 15. When the pantograph of locomotive 51 again touches the line 15, a 25-cycle load current may flow again because the locomotive transformer may again be magnetized. This load current may trip the relay C, but, at this time, the relay A will have been opened again so that there will be no actuation of circuit breakers.

When a compound coil or two separate coils 33 and 40 are used on the relay B, and an auxiliary contact 67 is also placed on relay B, if the high-frequency or auxiliary system fails entirely, a faulty conductor will still be isolated because, in the case of a short circuit 52 on conductor 15, there are currents of power-load frequency actuating the relay B through coil 33 closing its associated contacts 67 and actuating the circuit interrupter 17. Therefore, in case of failure of the entire superimposed control currents, the conductors 15 and 16 are still protected by the straight overcurrent system of protection.

There is also as illustrated, in Figs. 1 and 3, an alternative means of preventing improper action of relays due to the condenser charging currents.

This improvement relates to the relay A and to the circuit breaker 17 interlocking on any 500-cycle circuit-breaker control system, where the 500-cycle current is applied to the main power system through a series condenser 71 circuit, provided the relay A is also within the circuit of series condenser 71.

It has been found in the past that, if the contact line 15 is deenergized, i. e., breakers 17 at both ends are open, and either breaker 17 is closed, a transient 25-cycle current flows to the ground 73 through the condenser 71, which is of sufficient magnitude in some cases to cause the relay A to immediately trip this breaker 17, dependent upon the point in the wave at which the breaker is closed. The magnitude of this transient current is such that there is little possibility of eliminating this undesirable relay action by changing any of the constants in any of the circuits. Other means such as described herein are better adapted to avoid this difficulty. The reason for this rather large transient current is that the condenser 71, when uncharged, has little impedance to the 25-cycle load current. It is thus the charging current of the condenser 71 that sometimes causes the relay A to trip. This charging current results whenever the breaker 17 connects the contact line 15 to the source of power 13. It is proposed to overcome this difficulty by so inter-locking a means of short-circuiting the relay winding 32 with the circuit breaker 17 that, during the instant at which the breaker is closed, the relay coil 32 is short-circuited. The relay coil must be short-circuited rather than open-circuited because, after it is open-circuited and the circuit is later closed, the condenser might have a different charge, and a charging current would again cause the relay to operate.

A particular form of means, as illustrated in Fig. 3, is utilized for short-circuiting the coil 32 and must remain closed until the arcing contacts 81 of the breaker 17 have closed. The further motion of the breaker during which the main contacts 82 are closed, is used for the purpose of opening short-circuit contacts 86 and 87 so that the relay may be effective in case of a fault on the main line 15. This improvement therefore gives stability to the relay system by preventing improper relay action from surges caused by the closing of a circuit breaker.

Figs. 5(a) and 5(b) illustrate in detail two methods by which the time delay in the action of the member 37 (Fig. 4) of applicant's presetting relay may be obtained. Fig. 5(a) illustrates merely the usual type of dash pot which serves to delay motion of the lever 37 in both directions of its travel. Fig. 5(b) illustrates the electrical equivalent of the time-delay means shown in Fig. 5(a). Fig. 5(b) illustrates schematically the arrangements of the windings 33 and 40 on the presetting element 37 of element B of applicant's relay (Fig. 4). In addition to the windings 33 and 40, a damping winding is provided, the effect of which may be varied by means of a variable resistor connected in series therewith. This winding serves in the well-known manner to delay changes in the flux traversing the core member of the element B of the relay shown in Fig. 4.

In summary, the principal advantages of this protective relay system are that it provides a means and method of obtaining:

Selective action of circuit breakers so as to isolate a faulty conductor only and to leave undisturbed parallel or adjacent or other non-faulty conductors.

Simultaneous operation of circuit breakers at both ends of the faulty conductor.

Discrimination between a fault condition and other conditions which with most systems heretofore used, caused false operation of circuit breakers.

Automatic adjustment and pre-setting of the circuit breaker operating relay in accordance with load conditions or circuit conditions or both.

Compensation for out-of-phase control currents and avoidance of troubles arising due to the fact that the auxiliary sources of power may not operate in exact phase opposition.

The prevention of undesirable action of circuit breakers when faults or transients occur within the superimposed auxiliary circuit itself.

The prevention of undesirable action of circuit breakers in a non-faulty conductor from surges that may be set up in other conductors.

Straight overcurrent relay protection in the event of failure of the superimposed control current.

I claim as my invention:

1. A protective relay for an electrical power system having a circuit interrupter and an auxiliary source of current comprising means responsive to said auxiliary current for operating said circuit interrupter, and co-operative means responsive to power currents for restraining the first-named means.

2. A self-adjusting protective relay for an electrical power system including a circuit interrupter and a source of control current comprising a quick-acting operating element responsive to said control current for controlling said circuit interrupter, and a co-operating, slow-acting, adjusting element responsive to power currents for adjusting said operating element.

3. A self-adjusting protective relay for an electrical power system having a circuit interrupter and a source of high-frequency current comprising a quick-acting operating element having a tripping winding responsive to said high-frequency current, a movable contact member controlled by the tripping winding for actuating said circuit interrupter and a co-operating slow-acting adjusting element having a winding energized in accordance with the power system load currents, a movable member controlled thereby, resilient means for connecting the movable member to the movable contact member of the operating element, and means for retarding the action of the adjusting element.

4. A protective relay for an electrical power system having a circuit breaker and an auxiliary circuit for supplying control current thereto comprising means responsive to said auxiliary-circuit current for operating said circuit breaker, co-operative means for electro-responsively presetting the fore named operating means and means for providing a time delay in the presetting action.

5. A protective system for a circuit having sources of power and control currents and a circuit breaker comprising means responsive to said control current for operating said circuit breaker, cooperative means for electro-responsively presetting the operating means in accordance with said control current, and means for providing a time delay in the action of the presetting means.

6. A self-adjusting protective relay for an electrical power system including an auxiliary current supply and a circuit interrupter, comprising a quick-acting operating element responsive to said auxiliary current for controlling said circuit interrupter, and a co-operative slow-acting adjusting element responsive to said auxiliary current for presetting the operating element in accordance with said auxiliary current.

7. The combination with a power system having a circuit breaker and a source of high-frequency current, of a protective relay comprising means responsive to said high-frequency current for operating said circuit breaker, means for electro-responsively presetting the circuit-breaker-operating means, and means for providing time delay action of the presetting means.

8. In an electrical protective system, the combination with a main power conductor a return path therefor, a main source of power connected to the main conductor and to the return path, interrupting devices for the main conductor, means for actuating the interrupting devices, an auxiliary source of power of frequency different from that of the main source associated with each end of the conductor and operating in phase opposition, means for segregating auxiliary source currents from all other main conductors, means for excluding main source currents from auxiliary circuits, a protective relay comprising means responsive to the auxiliary-source current for operating the interrupting-device-actuating means, means for electro-responsively pre-setting the last named operating means, and means for providing time delay action of the pre-setting means.

9. The combination with a protective system operated by a high-frequency current superimposed on a low-frequency power line, a relay for tripping a circuit breaker in said line, means responsive to ground fault current for operating said relay, and means responsive to load current tending to prevent operation of said relay, said last mentioned means having a delayed action, whereby a sudden increase in line current due to a fault will cause operation of the relay to trip the breaker, and a gradual increase in line current due to increased load will operate the means tending to prevent operation of said relay.

10. The combination with a means for superposing a special frequency-control current on the load current in a power system and a circuit-breaker-tripping relay responsive to said control current, of a device for controlling the tripping relay in accordance with the magnitude of said control current.

11. The combination with a protective system of a relay for controlling a breaker in a power line, means for electro-responsively presetting the relay, and means for providing time delay or time lag action of the presetting means, and means for supervising the action of the relay and the presetting means.

12. The combination with a protective system operated by a special-control-frequency current superimposed upon a power line of a different frequency, of a relay for operating a circuit breaker in the power line, means for automatically pre-setting the relay, means for providing time delay or time lag action of the pre-setting means, and means for providing straight overload-current operation of the circuit breaker in case of failure of the superimposed currents.

13. In a circuit-breaker-control system for an electrical power system, the combination with a plurality of conductors, circuit breakers therefor, actuating means for the circuit breakers, and a main source of power connected thereto, of an auxiliary source of power superposed thereon of a special periodicity different from the periodicity of the main source and a relay responsive to sudden changes of the impedance of the power system to the superposed auxiliary current but unresponsive to gradual changes of such impedance for controlling the circuit breakers.

14. The combination with an electrical power system having superposed thereon auxiliary sources of current of a special control frequency operating normally in phase opposition, a relay responsive to current of the control frequency, said relay having a winding for compensating for out-of-phase control currents produced by the auxiliary sources not operating in exact phase opposition.

15. In a control system for a transmission system having a plurality of parallel conductors equipped with circuit-interrupters at their respective ends, a main source of power connected thereto, an auxiliary source of special frequency current superposed thereon and relay apparatus responsive to said auxiliary-source current for selectively actuating the circuit-interrupters at both ends of only a faulty conductor substantially instantaneously, including means operable in accordance with the magnitude of said control current.

16. The combination with a power system having a plurality of parallel conductors equipped with interrupting means at the respective ends thereof and a source of high-frequency current, of protective relay apparatus comprising means responsive to said high-frequency current for selectively operating the interrupting means substantially instantaneously at both ends of a faulty conductor only, means for electro-responsively pre-setting the interrupter-operating means, and means for providing time-delay action of the pre-setting means.

17. The combination with a power system having a plurality of parallel conductors equipped with interrupting means at the respective ends thereof and a source of high-frequency current, of protective relay apparatus comprising means responsive to said high-frequency current for selectively operating the interrupting means substantially instantaneously at both ends of a faulty conductor only, means for electro-responsively pre-setting the interrupter-operating means, and means for providing time-delay action of the pre-setting means, and means for supervising the action of the relay apparatus and the pre-setting means.

18. Control means for an electrical power system having a plurality of parallel conductors and circuit interrupters at the respective ends thereof and an auxiliary source of special-frequency current superposed thereon, including relay apparatus comprising means responsive to said auxiliary current for operating the circuit interrupters at both ends of only a faulty conductor substantially instantaneously, and co-operative means responsive to power currents for restraining the first-named means.

19. The combination with a protective system operated by a special-control-frequency current superimposed upon a transmission system of a different frequency, of relay apparatus for operating circuit-breakers substantially simultaneously at both ends of said system, means for electro-responsively pre-setting the relay apparatus, and means for providing time-delay action of the pre-setting means.

20. In a control system for a power line having circuit-interrupters at the ends thereof and a source of power therefor, means for superposing special-frequency control currents on said power line, relay apparatus responsive to said control currents for tripping the circuit-interrupters at both ends of the power line substantially simultaneously, and means for controlling said relay apparatus in accordance with the magnitude of said control current.

In testimony whereof, I have hereunto subscribed my name this first day of December, 1927.

LEON R. LUDWIG.